United States Patent [19]
Cornelius et al.

[11] Patent Number: 6,004,501
[45] Date of Patent: Dec. 21, 1999

[54] METHOD OF PRODUCING FAST-FIRED CORDIERITE BODIES

[75] Inventors: Edward E. Cornelius, Painted Post; Gregory A. Merkel, Big Flats, both of N.Y.

[73] Assignee: Corning Incorporated, Corning, N.Y.

[21] Appl. No.: 09/114,994

[22] Filed: Jul. 14, 1998

Related U.S. Application Data

[60] Provisional application No. 60/053,973, Jul. 28, 1997.

[51] Int. Cl.$^6$ ..................................................... C04B 33/32
[52] U.S. Cl. .......................... 264/631; 264/639; 264/679; 264/177.12
[58] Field of Search .............................. 264/631, 177.12, 264/679, 639

[56] References Cited

U.S. PATENT DOCUMENTS

| | | |
|---|---|---|
| 3,885,977 | 5/1975 | Lachman et al. |
| 3,979,216 | 9/1976 | Fritsch, Jr. et al. |
| 4,001,028 | 1/1977 | Frost et al. |
| 4,280,845 | 7/1981 | Matsuhisa et al. |
| 4,772,580 | 9/1988 | Hamanaka et al. |
| 4,869,944 | 9/1989 | Harada et al. |
| 4,877,670 | 10/1989 | Hamanaka et al. |
| 4,927,577 | 5/1990 | Ohtaka et al. |
| 5,046,946 | 9/1991 | Yasuda et al. |
| 5,114,643 | 5/1992 | Beall et al. ............................. 264/631 |
| 5,114,644 | 5/1992 | Beall et al. ............................. 264/631 |
| 5,258,150 | 11/1993 | Merkel et al. |
| 5,262,102 | 11/1993 | Wada. |
| 5,332,703 | 7/1994 | Hickman et al. |
| 5,409,870 | 4/1995 | Locker et al. |

FOREIGN PATENT DOCUMENTS 5085813 4/1993 Japan.

*Primary Examiner*—James Derrington
*Attorney, Agent, or Firm*—L. Rita Herzfeld

[57] ABSTRACT

A cordierite body is produced by providing cordierite-forming raw materials as talc, calcined talc, MgO-forming component, magnesium aluminate spinel, $SiO_2$-forming component, $Al_2O_3$-forming component, kaolin, calcined kaolin, and/or mullite, such that the quantity R is less than about 1.207. R is

0.253 (wt. % mullite powder)
+0.278(wt. % $SiO_2$ powder)
+0.00590(wt. % $SiO_2$ powder)(wt. % spinel powder)
−0.0193(wt. % $SiO_2$ powder)(heating time at maximum temperature)
−0.348(heating time at maximum temperature)
−0.00237(mean heating rate from 25° C. to 1275° C.)
+0.0736(wt. % alpha $Al_2O_3$ powder)(mean particle size of alpha $Al_2O_3$ powder)
+0.0892(wt. % $Al(OH)_3$ powder)(mean particle size of $Al(OH)_3$ powder)
−0.215(wt. % dispersible high surface area $Al_2O_3$-forming component)
+2.392($\log_{10}$(1+(wt. % MgO-forming component)(wt. % calcined kaolin))).

The raw materials are intimately blended with effective amount of vehicle and forming aids to form a plastic mixture. A green body is formed, which is dried and heated from room temperature up to a maximum temperature of about 1360° C. to 1435° C. at an average heating rate of at least about 70° C. per hour and held at maximum temperature for about 0.05 to 18 hours. The total heating time from room temperature to the end of the hold at the maximum temperature is about 4.5 to 20 hours. The resulting body is predominately cordierite, having a mean coefficient of thermal expansion from about 25° C. to 800° C. of less than about $9 \times 10^{-7}$° $C.^{-1}$ in at least one direction.

15 Claims, 1 Drawing Sheet

*Figure 1*

Legend:
- ○ Talc + spinel + kaolin
- □ Talc + MgO/Mg(OH)$_2$ + kaolin
- ◇ Talc + kaolin + fine Al$_2$O$_3$/AlOOH
- ▽ Talc + kaolin + fine Al$_2$O$_3$/AlOOH + calcined kaolin
- ● Talc + kaolin + coarse Al$_2$O$_3$/Al(OH)$_3$ ± calcined kaolin
- ⊠ Talc/MgO/Mg(OH)$_2$ + fine Al$_2$O$_3$/AlOOH + silica
- ▲ Talc/MgO/Mg(OH)$_2$ + coarse Al$_2$O$_3$/Al(OH)$_3$ + silica
- ⊞ Spinel + silica

METHOD OF PRODUCING FAST-FIRED CORDIERITE BODIES

This application claims the benefit of U.S. provisional application Ser. No. 60/053,973, filed Jul. 28, 1997, entitled METHOD OF PRODUCING FAST-FIRED CORDIERITE BODIES, by Edward E. Cornelius and Gregory A. Merkel.

This invention relates to a method of producing cordierite bodies that involves reducing the firing time required to produce a low expansion body. More particularly, the body is formed by extrusion. Still more particularly, the body has a honeycomb structure.

BACKGROUND OF THE INVENTION

Cordierite bodies having honeycomb structures are especially suited for but not limited to use as substrates for catalysts for converting automotive exhaust, for example, or as diesel particulate filters or as regenerator cores. Use of cordierite is favorable in these applications because of its good thermal shock resistance. The thermal shock resistance is inversely proportional to the coefficient of thermal expansion (CTE). That is, honeycombs with low thermal expansion have good thermal shock resistance and can survive the wide temperature fluctuations that are encountered in the application.

Although the mineral cordierite has an intrinsically low CTE (about $17 \times 10^{-7}$ °C.$^{-1}$ (25–800° C.)), cordierite ceramics formed by the reaction of certain simple or complex natural or synthetic raw materials (e.g. kaolin+talc+alumina; magnesia+alumina+silica; spinel+silica) can exhibit CTE's that are much lower. The attainment of these low expansions is dependent on three microstructural features related to the nucleation and growth of the cordierite: microcracking, crystal orientation, and residual phases. Microcracking is dependent on the anisotropy in the thermal expansion of cordierite along its crystallographic axes. Thermal stresses generated during cooling after firing result in microcrack formation. During reheating, some of the thermal expansion of the ceramic body is accommodated by the re-closing of the microcracks, yielding a reduction in the bulk CTE of the ceramic. The presence of microcracking in a ceramic body is manifested by hysteresis in the thermal expansion curve for that body.

The development of a non-random orientation of the cordierite crystals during sintering also influences thermal expansion. The extrusion of cellular bodies of cordierite-forming batches imparts an alignment or foliation of the tabular and plate-like raw materials, which in turn results in the growth of cordierite crystals in which the negative-expansion c-axes of the cordierite crystals tend to lie within the plane of the honeycomb walls. This microstructural feature further contributes to a reduced CTE in both the axial and radial dimensions of the honeycomb. The extent to which the cordierite crystals are oriented with their c axes in the plane of the cell walls of the honeycomb is measured by x-ray diffractometry (XRD) of the as-fired surfaces of the walls. Specifically, the XRD intensities of the (110) and (002) reflections from the cordierite crystals (based upon hexagonal indexing) are determined for the as-fired surface of the cell wall. The intensity of the (110) reflection, I(110), is proportional to the fraction of crystals lying with their c axes in the plane of the wall, while the intensity of the (002) reflection, I(002), is proportional to the fraction of crystals growing orthogonal to the cell wall. An "I-ratio" is defined by the following relation:

$$I = \frac{I(110)}{I(110) + I(002)}$$

The I ratio ranges from 0.0 for a body in which all of the cordierite crystals are oriented with their c axes perpendicular to the cell wall, to 1.00 for a body in which all of the crystals lie with their c axes within the plane of the wall. It has been found experimentally that a body in which the cordierite crystals are randomly oriented exhibits an I-ratio equal to approximately 0.655.

Finally, to achieve a low-CTE cordierite body, it is necessary that the reaction of the cordierite-forming raw materials proceed essentially to completion so that there exists a minimum of residual, high-expansion phases such as glass, cristobalite, mullite, alumina, spinel, and sapphirine in the body after sintering.

The formation of low thermal expansion cordierite bodies is dependent therefore on the nucleation of the cordierite raw materials and on its subsequent growth. An interplay exists between firing schedule and the nature of the raw materials such that a batch that yields a low-CTE ceramic when fired on a long schedule may result in a high expansion on a shorter schedule and vice versa. Specifically, shortening of the schedule may result in incomplete reaction of some batches, resulting in a CTE increase due to the presence of residual, high expansion phases. Alternately, faster firing rates and shorter schedules could decrease the expansion of other batches (provided that the reaction to form cordierite is nearly complete) by increasing the amount of microcracking.

At present, cordierite-forming cellular ceramics are fired at heating rates of about 10 to 200° C./hr. through specific segments, with average heating rates of approximately 30 to 70°/hr. from 25° C. to maximum temperature. Soak times at maximum temperature range from about 6 to 12 hours, and total firing cycles are greater than about 25 hours in duration.

A method for producing low thermal expansion cordierite bodies in which the total firing time is less than 20 hours, and preferably less than 10 hours would have several advantages. Among the advantages would be more efficient use of equipment, less energy consumption, and greater productivity.

SUMMARY OF THE INVENTION

In accordance with one aspect of the invention, there is provided a method of producing a cordierite body that involves providing cordierite-forming raw materials such as talc, calcined talc, MgO-forming component, magnesium aluminate spinel, SiO$_2$-forming component, Al$_2$O$_3$-forming component, kaolin, calcined kaolin, and/or mullite, such that the quantity R is less than about 1.207. R is 0.253 (wt. % mullite powder)
+0.278(wt. % SiO$_2$ powder)
+0.00590(wt. % SiO$_2$ powder)(wt. % spinel powder)
−0.0193(wt. % SiO$_2$ powder)(heating time at maximum temperature)
−0.348(heating time at maximum temperature)
−0.00237(mean heating rate from 25° C. to 1275° C.)
+0.0736(wt. % alpha Al$_2$O$_3$ powder)(mean particle size of alpha Al$_2$O$_3$ powder)
+0.0892(wt. % Al(OH)$_3$ powder)(mean particle size of Al(OH)$_3$ powder)
−0.215(wt. % dispersible high surface area Al$_2$O$_3$-forming component)

+2.392($\log_{10}$(1+(wt. % MgO-forming component)(wt. % calcined kaolin))).

The raw materials are intimately blended with an effective amount of vehicle and forming aids to form a plastic mixture. A green body is formed, which is dried and heated from room temperature up to a maximum temperature of about 1360° C. to 1435° C. at an average heating rate of at least about 70° C. per hour and held at maximum temperature for about 0.05 to 18 hours. The total heating time from room temperature to the end of the hold at the maximum temperature is about 4.5 to 20 hours. The resulting body is predominately cordierite, having a mean coefficient of thermal expansion from about 25° C. to 800° C. of less than about $9 \times 10^{-7}$° C.$^{-1}$ in at least one direction.

DETAILED DESCRIPTION OF THE INVENTION

The present invention relates to a method of producing a cordierite body having a mean coefficient of thermal expansion (CTE) from 25° C. to 800° C. of no greater than about $9 \times 10^{-7}$° C.$^{-1}$ in at least one of three orthogonal directions by mixing together certain magnesium, aluminum, and silicon containing raw materials, fabricating a green body such as by extrusion, firing the green body from room temperature to a maximum temperature ($T_{Max}$) of about 1360° C. to 1435° C. at an average heating rate of at least about 70° C./hr. and maintaining or soaking at the maximum temperature for about 0.05 to 18 hours such that the total time from room temperature until the end of the soak at maximum temperature is about 4.5 to 20 hours.

All particle sizes are mean or average particle diameter as measured by a sedimentation technique.

All percents are in weight unless otherwise specified.

The Raw Materials

The raw materials are selected that will form cordierite by reaction with one another on firing. Such raw materials include talc, calcined talc, MgO-forming component, magnesium aluminate spinel, $SiO_2$-forming component, $Al_2O_3$-forming component, kaolin, calcined kaolin, and/or mullite.

The $Al_2O_3$-forming component can be any of the various forms of $Al_2O_3$ or those species that when fired form $Al_2O_3$. Examples of $Al_2O_3$-forming components are alpha-alumina, gamma-alumina, delta-alumina, $Al(OH)_3$, boehmite, pseudoboehmite, and/or other transition aluminas, etc.

By MgO-forming component is meant MgO itself, or other material having low water solubility which when fired converts to MgO, such as $Mg(OH)_2$, $MgCO_3$, or combinations of these, etc.

Silica-forming component can be e.g. quartz, fused silica, colloidal silica powder or sol, and/or silicon organometallic compounds.

The composition preferably consists essentially of nominally about 12% to 16% magnesium oxide, about 33% to 38% aluminum oxide, and about 49% to 54% silica. The most preferred composition consists essentially of nominally about 12.5% to 15.5% magnesium oxide, about 33.5% to 37.5% aluminum oxide, and about 49.5% to 53.5% silica.

Low CTE is favored by longer heating times, faster heating rates below about 1275° C., low contents of an alpha-alumina or aluminum hydroxide raw material, fine particle size of the alumina or aluminum hydroxide powder when such a material is present, and a minimal amount of silica powder. Such processing conditions and raw material properties facilitate that reaction of the raw materials to form the desired cordierite phase. When free silica is present as a raw material, the amount of spinel raw material is preferably low. However, when free silica is low or absent, spinel as a raw material is beneficial in lowering CTE when it replaces an alpha-alumina or aluminum hydroxide. Longer soak times and/or higher soak temperatures are especially effective when silica powder is used and/or when the particle size of the alpha-alumina or aluminum hydroxide is coarse. The use of mullite powder as a source of Al and Si is preferably low, as mullite powder reduces the preferred orientation of the cordierite and also reduces the extent of microcracking. It is anticipated that kyanite or sillimanite (both $Al_2SiO_5$), would behave similarly to mullite ($Al_6Si_2O_{13}$) in raising CTE. However, these aluminosilicate raw materials would probably help reduce cracking when they substitute for kaolin in the batch. The combined use of an MgO-forming component and a calcined kaolin is preferably minimized because this combination also raises CTE by reducing crystal orientation and microcracking.

The use of a dispersible high surface area $Al_2O_3$-forming component is beneficial in reducing CTE. Dispersible high surface area $Al_2O_3$-forming component or source is a particular type of $Al_2O_3$-forming component. By dispersible is meant that the agglomerates of very fine particles can be broken up and dispersed into the constituent particles. By high surface area is meant a surface area greater than about 10 m$^2$/g and preferably greater than about 40 m$^2$/g. It can be provided as the powder or as a sol. Such powders can include boehmite, pseudoboehmite, gamma-phase alumina, delta-phase alumina, and/or other so-called transition aluminas.

Although a variety of cordierite-forming raw materials can be used in the practice of this invention, the quantity R must be less than about 1.207 where R is defined as 0.253(wt. % mullite powder)

+0.278(wt. % $SiO_2$ powder)

+0.00590(wt. % $SiO_2$ powder)(wt. % spinel powder)

−0.0193(wt. % $SiO_2$ powder)(heating time at maximum temperature)

−0.348(heating time at maximum temperature)

−0.00237(mean heating rate from 25° C. to 1275° C.)

+0.0736(wt. % alpha $Al_2O_3$ powder)(mean particle size of alpha $Al_2O_3$ powder)

+0.0892(wt. % $Al(OH)_3$ powder)(mean particle size of $Al(OH)_3$ powder)

−0.215(wt. % dispersible high surface area $Al_2O_3$-forming component)

+2.392($\log_{10}$(1+(wt. % MgO-forming component)(wt. % calcined kaolin))).

Figure 1:
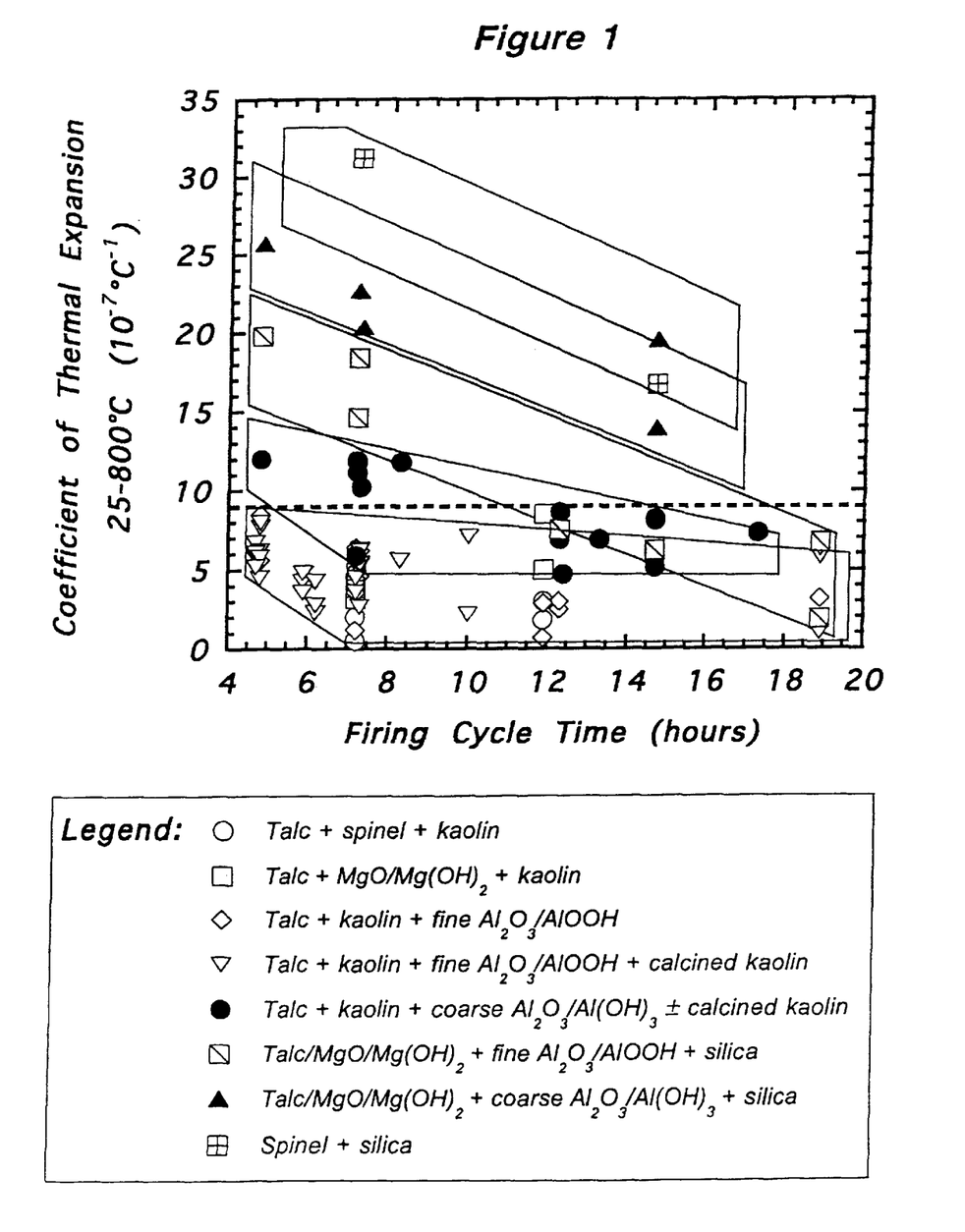
FIG. 1 is a plot of CTE versus Firing Cycle Time for bodies produced from various raw material combinations.

The relationship of CTE to firing cycle and raw materials is appreciated with reference to the examples in Tables 1 to 3 and FIG. 1.

To achieve low CTE's with short firing times using less than about 5% mullite and less than about 5% silica powder, six types of batches are preferred for especially low CTE's and short firing cycles (where the quantity R is defined as above): (1) talc+MgO-forming component+kaolin, (2) talc+ spinel+kaolin, (3) talc+spinel+kaolin+calcined kaolin, (4) talc+kaolin+$Al_2O_3$-forming component having a mean particle size of no greater than about 3.0 micrometers and/or a specific surface area not less than about 3 m$^2$/g, (5) talc+ kaolin+an $Al_2O_3$-forming component having a mean particle size of no greater than about 3.0 micrometers, and/or a specific surface area not less than about 3 $m^2/g$+calcined kaolin, and (6) talc+MgO-forming component+kaolin+ $Al_2O_3$-forming component having a particle size of no greater than about 3.0 micrometers and/or a specific surface area not less than about 3 $m^2/g$.

With the second and fourth combinations, the kaolin preferably has a particle size of at least about 3 micrometers for increasing the percent porosity. However, it can have a particle size of less than 3 micrometers if lower porosity is desired.

The fifth combination is especially preferred because of its resistance to cracking during drying and firing and because of the low cost and high availability of these raw materials.

With the fifth combination, the calcined kaolin preferably has at least about 1% mullite crystallites. This results from sufficient calcination to ensure that the problem of poor cordierite orientation and high CTE associated with some undercalcined kaolins does not occur. Also, the particle size of the $Al_2O_3$-forming component is preferably no greater than about 1.5 micrometers and/or the specific surface area is not less than about 5 $m^2/g$. The mean particle size of the talc is preferably no greater than about 4 micrometers, and more preferably no greater than about 2.5 micrometers. The finer talc increases the percent porosity and promotes a greater fraction of pores having diameters between about 0.5 and 5.0 micrometers as measured by mercury porosimetry, properties that benefit washcoat pick-up and adherence. The particle size of the kaolin is preferably no greater than about 2 micrometers.

With the third combination, it is preferred that the calcined kaolin have at least about 1% by weight mullite crystallites.

In the raw material mixtures that contain a kaolin, and do not contain a MgO-forming component, part or all of the kaolin may be replaced with a calcined kaolin to reduce the tendency of the green body to fracture during firing. When a calcined kaolin is used, it preferably consists predominately of particles having a plate-like morphology, and is preferably calcined at a sufficiently high temperature to form some mullite within the former clay particles. It has been found that the mullite within the calcined kaolin particles does not increase CTE, in contrast to the presence of particulate mullite in the raw material mixture.

Raw materials are selected so that the total about of $K_2O+Na_2O+CaO$ is less than about 0.5%.

The raw materials are blended with vehicle and forming aids that impart plastic formability and green strength to the raw materials when they are shaped into a body. When the forming is done by extrusion, the extrusion aids are most typically cellulose ether organic binder, and a lubricant such as sodium ammonium or diglycol stearate, although the invention is not limited to these.

The Organic Binder

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose, while Methocel F4M, F240, and K75M are hydroxypropyl methylcellulose.

The organic binder content is typically is about 3% to 6%, based on the raw material.

The vehicle can be inorganic, i.e. consisting largely of water, which is typically but not exclusively about 28% to 46%; or it can be organic. The use of water is preferred, although evaporable organic liquids such as lower alkanols can be wholly or partly substituted as desired.

The weight percents of the organic binder, vehicle and other additives are calculated as superadditions with respect to the raw materials.

The mixture is then formed into a green body. The preferred forming method is by extrusion through a die. Extrusion can be done by using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The bodies according to the present invention can have any convenient size and shape. However, the process is especially suited to production of cellular monolith bodies such as honeycombs. Cellular bodies find use in a number of applications such as catalyst carriers, filters such as diesel particulate filters, molten metal filters, regenerator cores, etc.

Generally honeycomb cell densities range from 235 cells/ $cm^2$ (about 1500 cells/$in^2$) to 15 cells/$cm^2$ (about 100 cells/$in^2$). Some examples of commonly used honeycombs in addition to these, although it is to be understood that the invention is not limited to such, are about 94 cells/$cm^2$ (about 600 cells/$in^2$), about 62 cells/$cm^2$ (about 400 cells/ $in^2$), or about 47 cells/$cm^2$ (about 300 cells/$in^2$), and those having about 31 cells/$cm^2$ (about 200 cells/$in^2$). Typical wall thicknesses are for example, about 0.15 mm (about 6 mils) for about 62 cells/$cm^2$ (about 400 cells/$in^2$) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/$cm^2$ (about 100 to about 200 cells/$in^2$) and about 0.30 to about 0.64 mm (about 12 to about 25 mil) wall thicknesses are especially suited for diesel particulate filter applications. This invention is especially advantageous for honeycombs having very thin walls, e.g. $\leq 0.13$ mm (5 mils). Thinner walled honeycombs can be made, e.g. 0.025–0.1 mm (1–4 mils), for some of the inventive mixtures, especially those that contain clay, alumina, and a talc all of which have a mean particle size of <3 micrometers in diameter.

The green body is then dried according to conventional procedures for green cordierite bodies such as e.g. oven or dielectric drying.

The dried body is then fired under the conditions described earlier, to a maximum temperature of about 1360° C. to 1465° C. Although the mean heating rate is more rapid than has been routinely employed in firing cordierite ceramics, e.g. honeycombs, it is appreciated that slower heating rates can be employed through certain segments of the firing schedule in which the body is undergoing shrinkage or an endothermic reaction. Thus, for example, it is desirable to fire a talc and kaolin containing body at a heating rate of $\leq 100°$ C./hr. between about 400° C. and 550° C. (kaolin water loss) and between about 800° C. and 950° C. (talc water loss), and a heating rate of $\leq 150°$ C./hr. between about 950° C. and 1150° C. (high shrinkage region). However, the heating rate can be accelerated during other portions of the firing schedule to yield an average rate from about 25° C. to maximum temperature of at least about 70° C./hr. and even at least about 200° C./hr.

The fired body is then cooled to room temperature in as short a time as is practical.

When prepared according to the inventive methods, the bodies exhibit a CTE from 25 to 800° C. of no greater than about $9 \times 10^{-7°}$ C.$^{-1}$ and preferably no greater than about $6 \times 10^{-7°}$ C.

Volume porosities are observed to range from about 9% to 39%, although it is probable that a pore-forming agent can be added to increase the volume fraction of porosity in the fired body. Median pore sizes range from about 0.2 to 28 microns, depending upon the particle sizes of the raw materials, and can probably be extended to larger pore sizes.

To more fully illustrate the invention, the following non-limiting examples are presented. All parts, portions, and percentages are on a weight basis unless otherwise stated.

Table 1 lists the raw materials used in the compositions prepared according to the inventive method and comparative methods. Firing schedules of the examples are given in Table 2, and physical properties of the examples are given in Table 3. All batches were mixed with water, methylcellulose, and sodium stearate, and extruded as 2.54 cm (1") diameter, 62 cells/cm$^2$ (400 cells/in.$^2$), 0.2 mm (8 mil) wall honeycomb. Additionally, Table 4 illustrates a fast firing schedule for sintering crack-free, full-size honeycomb bodies having a "racetrack" contour, and measuring 7.6 cm×11.4 cm×10.1 cm long (3"×4.5"×4") having 62 cells/cm$^2$ (400 cells/in.$^2$) and 0.13 mm (5 mil) wall thickness. All examples were fired in electrically heated furnaces. Firings greater than about 40 hours were performed in silicon carbide "Globar" furnaces, whereas all other firings were conducted in furnaces with molybdenum disilicide heating elements. The fast-firing cycles of the inventive method are especially suitable for firing in roller hearth kilns or by microwave sintering.

INVENTIVE AND COMPARATIVE EXAMPLES

The thermal expansions of all inventive and comparative examples listed in Table 3 are consistent with the restrictive equation for raw materials. That is, the value of R is less than 1.207 for all inventive examples and is greater than 1.207 for all comparative examples for which the firing cycle is between 4.5 and 20 hours. Thermal expansions were measured in the direction that is parallel to the lengths of the open channels in the honeycomb ceramics.

Raw Material Combinations that Contain Spinel

Inventive Examples 1 to 5 demonstrate that bodies with especially low CTE's are obtained when the raw materials consist of talc+spinel+kaolin. The use of fine spinel as the additional source of aluminum instead of alpha-alumina or aluminum hydroxide, Al(OH)$_3$, is beneficial in promoting microcracking in the fired body.

Comparative Examples 6 and 7 illustrate that especially high CTE's are observed when a mixture of spinel powder and silica powder are fired in less than 20 hours due to excessive amounts of unreacted spinel and cristobalite. However, comparative Example 8 shows that this raw material combination is capable of yielding a body with a CTE of less than $9 \times 10^{-7°}$ C.$^{-1}$ when fired on a longer cycle so that sufficient time is provided for reaction of the raw materials.

Raw Material Combinations that Contain Kaolin+an MgO-forming Component

Examples 9, 10, 12, 14, and 15 demonstrate that inventive bodies with especially low CTE's are also obtained when the raw materials consist of talc+kaolin+a magnesia-forming component such as MgO or Mg(OH)$_2$. The kaolin and the magnesia-forming source can span a wide range in mean particle size. The absence of any aluminum-containing source other than kaolin is beneficial in promoting reactivity of the body to form cordierite, as evidenced by the low amounts of high-CTE secondary phases. Comparative examples 11 and 13 demonstrate that bodies formed from these raw material combinations exhibit high CTE's when fired on firing cycles that are longer than 20 hours, due to reduced microcracking resulting from prolonged interaction between the kaolin and MgO-forming during heating of the body.

Example 16 shows that inventive bodies are obtained when the raw materials consist of MgO+kaolin+silica powder, because the amount of silica powder required to supply the additional silicon needed to form cordierite is relatively low. Comparative Example 17 illustrates that this raw material combination results in a high CTE when fired on a cycle longer than about 20 hours.

Example 18 demonstrates that inventive bodies can be formed from a mixture of MgO+kaolin+alumina+silica powder. However, the CTE is not as low as for Example 16 due to the larger amount of residual, high-CTE secondary phases resulting from the higher amount of silica powder required when some of the kaolin is replaced with an alumina-forming component. Comparative Example 19 shows that this raw material combination yields a CTE greater than $9 \times 10^{-7°}$ C.$^{-1}$ when fired on a cycle longer than about 20 hours.

Raw Material Combinations that Contain Calcined Kaolin+an MgO-forming Component

Comparative Examples 20 to 23 illustrate that the bodies made from talc+MgO+kaolin+calcined kaolin exhibit high expansions regardless of whether they are fired on a fast cycle less than 20 hours or a long cycle greater than 20 hours, despite the fact that all such bodies have very small amounts of high-CTE secondary phases. The combination of an MgO-forming source and a calcined kaolin is especially detrimental in reducing the microcracking and cordierite crystal orientation that are necessary for low CTE.

Comparative Examples 24 and 25 show that the combination of MgO+calcined kaolin+silica powder in the absence of kaolin similarly yields high-CTE bodies for fast or long firing cycles.

Raw Material Combinations that Contain an MgO-forming Component+Alumina, or an MgO-forming Component+Al(OH)$_3$ Example 26 demonstrates that an inventive body can be made from a mixture of the simple oxides MgO+Al$_2$O$_3$+SiO$_2$, with neither talc nor kaolin nor calcined kaolin in the batch. In such bodies, it is necessary that the magnesia and alumina both be of fine particle size to offset the large amount of silica powder, and firing cycles longer than about 10 hours are required to yield a CTE less than $9 \times 10^{-7°}$ C.$^{-1}$. Comparative Examples 27 and 28 show that this combination of raw materials does not yield CTE's less than $9 \times 10^{-7°}$ C.$^{-1}$ when the firing cycle is less than 10 hours due to the presence of large amounts of high-CTE secondary phases.

Comparative examples 29 to 31 demonstrate that the combination of a coarse magnesium hydroxide, an aluminum hydroxide powder of intermediate particle size, and a large amount of silica powder results in excessive amounts of unreacted secondary phases and a CTE greater than about $9 \times 10^{-7\circ}$ C.$^{-1}$ when fired on cycles of about 4.8 hours to 14.7 hours. Example 32 shows that this raw material combination is capable of yielding a body with a CTE of less than $9 \times 10^{-7\circ}$ C.$^{-1}$ when fired on a conventional longer schedule of about 54 hours.

Raw Material Combinations that Contain Talc+Kaolin+an Alumina-forming Component

Examples 33 to 35 and 37 to 39 show that low expansions are achieved in bodies made from talc+kaolin+alumina when all raw materials are of fine particle size and when the firing cycle is less than 20 hours. Firing cycles are preferably greater than about 8 hours to promote reaction of the alumina with the talc and kaolin. Comparative Examples 36 and 40 demonstrate that CTE's greater than $9 \times 10^{-7\circ}$ C.$^{-1}$ are observed when the firing cycle is longer than 20 hours. This is caused by reduced microcracking in bodies that contain talc and kaolin both of fine particle size when such bodies are fired with slower, conventional heating rates.

Examples 41 and 42 illustrate that similarly low CTE's are obtained for talc+kaolin+alumina bodies fired in under 20 hours when the talc is coarse and when the kaolin and alumina are fine.

Examples 43 and 44 show that inventive bodies are also attained for mixtures of coarse talc+fine kaolin+fine alumina with the addition of 5% of a fine silica powder.

Examples 45 and 46 demonstrate that inventive bodies with especially low CTE's are achieved when the alumina-forming source is provided as a dispersible AlOOH powder having a very high surface area in mixtures of talc+kaolin+AlOOH.

Example 47 further shows that inventive bodies with low CTE's are feasible for talc+kaolin+alumina mixtures even when both the talc and kaolin are coarse, provided that the alumina is still fine.

Examples 48 and 49 demonstrate that very low CTE's are attained for talc+kaolin+fine alumina bodies fired in less than 20 hours even when the mean particle size of the talc is much less than the mean particle size of the kaolin.

Examples 50 and 51 show that the inventive bodies can still be achieved for talc+kaolin+alumina bodies when the mean particle size of the alumina is about 4.5 micrometers, although longer soak times at the maximum temperature are required to attain expansions as low as Examples 42 and 47 made with the same talc and kaolin combinations, but with finer alumina.

Raw Material Combinations Containing Talc+Kaolin+Calcined Kaolin+an Al$_2$O$_3$-forming component Examples 52 to 85 illustrate that inventive bodies can be prepared from talc+fine kaolin+fine alumina+calcined kaolin, and that the mean particle size of the talc can range from at least as fine as about 1.6 micrometers to at least as large as about 6.1 micrometers. Talcs having mean particle size less than about 3 micrometers yield bodies with especially narrow pore size distributions between 0.5 and 5.0 micrometers.

Example 86 demonstrates that especially low expansion inventive bodies are obtained when a dispersible, high surface area AlOOH powder is provided as the alumina-forming component. Such bodies also exhibit an especially high degree of alignment of the cordierite crystals with their c axes lying in the plane of the cell wall.

Examples 87 to 92 show that inventive bodies are obtained for talc+kaolin+calcined kaolin+coarse alumina+ silica powder when firing cycle times are greater than about 10 hours. However, comparative examples 93 to 96 show that such raw material combinations yield CTE's greater than about $9 \times 10^{-7\circ}$ C.$^{-1}$ when the firing cycle is less than about 10 hours.

Examples 97, 98, 100, and 101 demonstrate that when fine talc is used in combination with a coarse alumina+coarse or fine kaolin+calcined kaolin, inventive bodies are achieved when the firing cycle is greater than about 13 hours. Examples 99 and 102 show that the slow heating times employed by conventional firing cycles result in CTE's greater than about $9 \times 10^{-7\circ}$ C.$^{-1}$ for bodies made from these raw material combinations.

Raw Material Combinations Containing Talc+an Al$_2$O$_3$-forming Component+Silica Powder Examples 103 to 105 show that inventive bodies can also be made from mixtures of talc+fine alumina+fine silica without kaolin or calcined kaolin, although the soak times required to achieve a CTE less than $9 \times 10^{-7\circ}$ C.$^{-1}$ are longer than those for kaolin-containing batches that have lower contents of silica powder.

Example 106 demonstrates that inventive bodies having especially low CTE's are obtained from a combination of fine talc+fine alumina+silica powder.

Examples 107 and 108 show that bodies made from talc+coarse alumina+silica powder do not exhibit CTE's less than about $9 \times 10^{-7\circ}$ C.$^{-1}$ when the firing times are less than about 20 hours, due to large amounts of residual secondary phases resulting from the coarse alumina and large quantity of silica powder. Example 109 illustrates that this combination of raw materials is capable of yielding a low CTE body when the firing times are much longer.

Raw Material Combinations Containing Mullite Powder

Examples 110 and 111 show that the combination of talc+mullite powder+silica powder yields a body with a CTE greater than $9 \times 10^{-7\circ}$ C.$^{-1}$ for both a 7.2 hour cycle and a 63 hour cycle. Examples 112 and 113 illustrate CTE's greater than about $9 \times 10^{-7\circ}$ C.$^{-1}$ for a similar raw material combination fired in 7.2 hours or 63 hours in which a part of the mullite powder has been replaced by alumina and more silica powder. For all four of these examples, the amounts of secondary phases are low; thus, the high CTE's are not the result of high expansion residual phases. Instead, the high expansions are due to the near absence of microcracking in bodies made from raw material combinations that contain large amounts of mullite powder.

INVENTIVE EXAMPLES OF LARGER SIZE HONEYCOMBS

Examples 114 through 117 (Table 4) prove the feasibility of sintering a full size honeycomb on a tailored fast firing schedule by reducing the heating rates through the temperature intervals of the kaolin dehydration (450–550° C.), the talc dehydration (800–950° C.), and the shrinkage (950–1150° C.). The batch composition No. 25, Table 1, was used in these examples. The honeycomb dimensions were given earlier for the full-size racetrack contour body. A crack-free body with a CTE (800° C.) of $4.95 \times 10^{-7\circ}$ C.$^{-1}$ was produced on an 8.2 hour firing cycle. The modulus of rupture for an axial cellular bar was about 2.75 MPa (about 400 psi) and the elastic modulus was about 5.6 GPa (about 0.81 Mpsi). The computed thermal shock parameter=MOR/(E)A(CTE) was about 1010° C. Thus, cordierite bodies that have been fast-fired according to the present invention are expected to maintain an excellent thermal shock resistance.

It should be understood that while the present invention has been described in detail with respect to certain illustrative and specific embodiments thereof, it should not be considered limited to such but may be used in other ways without departing from the spirit of the invention and the scope of the appended claims.

TABLE 1

Weight percentages and mean particle sizes of raw materials used in examples

BATCH COMPOSITION IN WEIGHT PERCENT (mean particle size, in microns, given in parentheses)

| Composition Number | Talc | MgO | Mg(OH)$_2$ | MgAl$_2$O$_4$ | Kaolin | Calcined Kaolin | Mullite | Alumina | AlOOH (180 m$^2$/g) | Al(OH)$_3$ | Silica |
|---|---|---|---|---|---|---|---|---|---|---|---|
| 1  | 29.3 (6.1) |           |            | 11.0 (1.0) | 59.8 (0.4) |           |           |            |      |            |            |
| 2  | 29.3 (6.1) |           |            | 11.0 (1.0) | 59.8 (0.9) |           |           |            |      |            |            |
| 3  | 29.3 (6.1) |           |            | 11.0 (1.0) | 59.8 (7.4) |           |           |            |      |            |            |
| 4  |            |           |            |            | 48.6 (1.0) |           |           |            |      |            | 51.4 (4.6) |
| 5  | 14.3 (6.1) | 7.6 (0.8) |            |            | 78.1 (0.9) |           |           |            |      |            |            |
| 6  | 13.9 (6.1) |           | 10.7 (6.5) |            | 75.5 (0.9) |           |           |            |      |            |            |
| 7  | 13.9 (6.1) |           | 10.7 (6.5) |            | 75.5 (7.4) |           |           |            |      |            |            |
| 8  |            | 12.3 (0.8)|            |            | 78.6 (7.4) |           |           |            |      |            | 9.2 (4.6)  |
| 9  |            | 12.5 (0.8)|            |            | 67.9 (0.9) |           |           | 4.7 (0.4)  |      |            | 14.9 (4.6) |
| 10 | 15.3 (1.6) | 8.2 (0.8) |            |            | 33.4 (0.9) | 43.1 (1.6)|           |            |      |            |            |
| 11 | 15.3 (6.1) | 8.2 (0.8) |            |            | 33.4 (0.9) | 43.1 (1.6)|           |            |      |            |            |
| 12 |            | 13.8 (0.8)|            |            | 76.0 (1.6) |           |           |            |      |            | 10.3 (4.6) |
| 13 |            | 13.8 (0.8)|            |            |            |           |           | 35.1 (0.4) |      |            | 51.1 (4.6) |
| 14 |            |           | 16.0 (6.5) |            |            |           |           |            |      | 43.0 (3.0) | 41.0 (4.6) |
| 15 | 39.6 (2.1) |           |            |            | 47.1 (0.3) |           |           | 13.3 (0.4) |      |            |            |
| 16 | 39.6 (2.1) |           |            |            | 47.1 (0.9) |           |           | 13.3 (0.4) |      |            |            |
| 17 | 39.6 (6.1) |           |            |            | 47.1 (0.3) |           |           | 13.3 (0.4) |      |            |            |
| 18 | 39.6 (6.1) |           |            |            | 47.1 (0.9) |           |           | 13.3 (0.4) |      |            |            |
| 19 | 40.2 (6.1) |           |            |            | 37.1 (0.9) |           |           | 17.8 (0.4) |      |            | 5.0 (0.6)  |
| 20 | 38.2 (6.1) |           |            |            | 45.5 (0.9) |           |           |            | 16.3 |            |            |
| 21 | 39.6 (6.1) |           |            |            | 47.1 (7.4) |           |           | 13.3 (0.4) |      |            |            |
| 22 | 39.6 (1.6) |           |            |            | 47.1 (7.4) |           |           | 13.3 (0.4) |      |            |            |
| 23 | 39.6 (6.1) |           |            |            | 47.1 (0.9) |           |           | 13.3 (4.5) |      |            |            |
| 24 | 39.6 (6.1) |           |            |            | 47.1 (7.4) |           |           | 13.3 (4.5) |      |            |            |
| 25 | 40.8 (6.1) |           |            |            | 14.8 (0.9) | 30.8 (1.6)|           | 13.7 (0.4) |      |            |            |
| 26 | 40.9 (4.2) |           |            |            | 12.8 (0.9) | 32.6 (1.6)|           | 13.7 (0.4) |      |            |            |
| 27 | 40.9 (3.4) |           |            |            | 12.8 (0.9) | 32.6 (1.6)|           | 13.7 (0.4) |      |            |            |
| 28 | 40.9 (2.2) |           |            |            | 12.8 (0.9) | 32.6 (1.6)|           | 13.7 (0.4) |      |            |            |
| 29 | 40.9 (1.6) |           |            |            | 12.8 (0.9) | 32.6 (1.6)|           | 13.7 (0.4) |      |            |            |
| 30 | 40.0 (1.6) |           |            |            | 14.0 (0.9) | 29.0 (1.6)|           |            | 17.1 |            |            |
| 31 | 40.7 (6.1) |           |            |            | 15.4 (7.4) | 26.4 (1.6)|           | 15.4 (4.5) |      |            | 2.0 (4.6)  |
| 32 | 40.9 (1.6) |           |            |            | 12.8 (7.4) | 32.6 (1.6)|           | 13.7 (4.5) |      |            |            |
| 33 | 40.9 (1.6) |           |            |            | 12.8 (0.9) | 32.6 (1.6)|           | 13.7 (4.5) |      |            |            |
| 34 | 42.4 (6.1) |           |            |            |            |           |           | 34.2 (0.4) |      |            | 23.5 (4.6) |
| 35 | 42.4 (1.6) |           |            |            |            |           |           | 34.2 (0.4) |      |            | 23.5 (4.6) |
| 36 | 42.4 (6.1) |           |            |            |            |           |           | 34.2 (4.5) |      |            | 23.5 (4.6) |
| 37 | 42.4 (6.1) |           |            |            |            |           | 47.6 (2.6)|            |      |            | 10.1 (4.6) |
| 38 | 42.4 (6.1) |           |            |            |            |           | 40.5 (2.6)| 5.1 (0.4)  |      |            | 12.1 (4.6) |

TABLE 2

Firing schedules used for examples

| Example Number | Composition Number | Example Type | Mean Heating Rate (25–1275° C.) (° C./hr) | Soak Time at 1275° C. (hrs) | Mean Heating Rate (1275–1410° C.) (° C./hr) | Maximum Soak Temperature (° C.) | Soak Time at Maximum Temperature (hrs) | Cycle Time* (hours) |
|---|---|---|---|---|---|---|---|---|
| 1  | 1 | Inventive   | 200 | 0 | 200 | 1410 | 5  | 11.9 |
| 2  | 1 | Inventive   | 625 | 0 | 625 | 1410 | 5  | 7.2  |
| 3  | 2 | Inventive   | 200 | 0 | 200 | 1410 | 5  | 11.9 |
| 4  | 2 | Inventive   | 625 | 0 | 625 | 1410 | 5  | 7.2  |
| 5  | 3 | Inventive   | 625 | 0 | 625 | 1410 | 5  | 7.2  |
| 6  | 4 | Comparative | 625 | 0 | 625 | 1410 | 5  | 7.2  |
| 7  | 4 | Comparative | 625 | 0 | 200 | 1410 | 12 | 14.7 |
| 8  | 4 | Comparative | 40  | 0 | 14  | 1430 | 10 | 52.3 |
| 9  | 5 | Inventive   | 200 | 0 | 200 | 1410 | 5  | 11.9 |
| 10 | 5 | Inventive   | 625 | 0 | 625 | 1410 | 5  | 1.2  |
| 11 | 5 | Comparative | 40  | 0 | 14  | 1430 | 10 | 52.3 |
| 12 | 6 | Inventive   | 625 | 0 | 625 | 1410 | 5  | 7.2  |
| 13 | 6 | Comparative | 25  | 0 | 25  | 1410 | 8  | 63.4 |
| 14 | 7 | Inventive   | 200 | 0 | 200 | 1410 | 5  | 11.9 |
| 15 | 7 | Inventive   | 625 | 0 | 625 | 1410 | 5  | 7.2  |
| 16 | 8 | Inventive   | 625 | 0 | 625 | 1410 | 5  | 7.2  |
| 17 | 8 | Comparative | 50  | 0 | 50  | 1410 | 8  | 35.7 |
| 18 | 9 | Inventive   | 625 | 0 | 625 | 1410 | 5  | 7.2  |
| 19 | 9 | Comparative | 40  | 0 | 14  | 1430 | 10 | 52.3 |

TABLE 2-continued

Firing schedules used for examples

| Example Number | Composition Number | Example Type | Mean Heating Rate (25–1275° C.) (° C./hr) | Soak Time at 1275° C. (hrs) | Mean Heating Rate (1275–1410° C.) (° C./hr) | Maximum Soak Temperature (° C.) | Soak Time at Maximum Temperature (hrs) | Cycle Time* (hours) |
|---|---|---|---|---|---|---|---|---|
| 20 | 10 | Comparative | 625 | 0 | 625 | 1410 | 5 | 7.2 |
| 21 | 10 | Comparative | 25 | 0 | 25 | 1410 | 8 | 63.4 |
| 22 | 11 | Comparative | 625 | 0 | 625 | 1410 | 5 | 7.2 |
| 23 | 11 | Comparative | 25 | 0 | 25 | 1410 | 8 | 63.4 |
| 24 | 12 | Comparative | 625 | 0 | 625 | 1410 | 5 | 7.2 |
| 25 | 12 | Comparative | 25 | 0 | 25 | 1410 | 8 | 63.4 |
| 26 | 13 | Inventive | 625 | 0.25 | 1620 | 1414 | 10 | 12.3 |
| 27 | 13 | Comparative | 625 | 0 | 625 | 1410 | 5 | 7.2 |
| 28 | 13 | Comparative | 625 | 0.25 | 1620 | 1414 | 2.5 | 4.8 |
| 29 | 14 | Comparative | 625 | 0.25 | 1620 | 1415 | 2.5 | 4.8 |
| 30 | 14 | Comparative | 625 | 0.25 | 1620 | 1415 | 5 | 7.3 |
| 31 | 14 | Comparative | 625 | 0 | 200 | 1410 | 12 | 14.7 |
| 32 | 14 | Comparative | 40 | 0 | 14 | 1430 | 10 | 52.3 |
| 33 | 15 | Inventive | 625 | 0.25 | 1620 | 1414 | 10 | 12.3 |
| 34 | 15 | Inventive | 625 | 0.25 | 1620 | 1414 | 5 | 7.3 |
| 35 | 15 | Inventive | 625 | 0.25 | 1620 | 1414 | 2.5 | 4.8 |
| 36 | 15 | Comparative | 50 | 0 | 50 | 1410 | 8 | 35.7 |
| 37 | 16 | Inventive | 625 | 0.25 | 1620 | 1414 | 10 | 12.3 |
| 38 | 16 | Inventive | 625 | 0.25 | 1620 | 1414 | 5 | 7.3 |
| 39 | 16 | Inventive | 625 | 0.25 | 1620 | 1414 | 2.5 | 4.8 |
| 40 | 16 | Comparative | 50 | 0 | 50 | 1410 | 8 | 35.7 |
| 41 | 17 | Inventive | 625 | 0 | 625 | 1410 | 5 | 7.2 |
| 42 | 18 | Inventive | 625 | 0 | 625 | 1410 | 5 | 7.2 |
| 43 | 19 | Inventive | 200 | 0 | 200 | 1410 | 5 | 11.9 |
| 44 | 19 | Inventive | 625 | 0 | 625 | 1410 | 5 | 7.2 |
| 45 | 20 | Inventive | 200 | 0 | 200 | 1410 | 5 | 11.9 |
| 46 | 20 | Inventive | 625 | 0 | 625 | 1410 | 5 | 7.2 |
| 47 | 21 | Inventive | 625 | 0 | 625 | 1410 | 5 | 7.2 |
| 48 | 22 | Inventive | 200 | 0 | 200 | 1410 | 12 | 18.9 |
| 49 | 22 | Inventive | 625 | 0 | 625 | 1410 | 5 | 7.2 |
| 50 | 23 | Inventive | 625 | 0 | 625 | 1410 | 5 | 7.2 |
| 51 | 24 | Inventive | 625 | 0 | 200 | 1410 | 12 | 14.7 |
| 52 | 25 | Inventive | 200 | 0 | 200 | 1410 | 12 | 18.9 |
| 53 | 25 | Inventive | 625 | 0.25 | 1620 | 1414 | 5 | 7.3 |
| 54 | 25 | Inventive | 625 | 0 | 625 | 1410 | 5 | 7.2 |
| 55 | 25 | Inventive | 1200 | 0 | 50 | 1410 | 2.5 | 6.2 |
| 56 | 25 | Inventive | 1500 | 0 | 1500 | 1410 | 5 | 5.9 |
| 57 | 25 | Inventive | 625 | 0.25 | 1620 | 1414 | 2.5 | 4.8 |
| 58 | 25 | Inventive | 625 | 0 | 625 | 1410 | 2.5 | 4.7 |
| 59 | 26 | Inventive | 200 | 0 | 200 | 1410 | 12 | 18.9 |
| 60 | 26 | Inventive | 625 | 0.25 | 1620 | 1414 | 5 | 7.3 |
| 61 | 26 | Inventive | 625 | 0 | 625 | 1414 | 5 | 7.2 |
| 62 | 26 | Inventive | 625 | 0.25 | 1620 | 1414 | 2.5 | 4.8 |
| 63 | 26 | Inventive | 625 | 0 | 625 | 1414 | 2.5 | 4.7 |
| 64 | 27 | Inventive | 200 | 0 | 200 | 1410 | 12 | 18.9 |
| 65 | 27 | Inventive | 625 | 0.25 | 1620 | 1414 | 5 | 7.3 |
| 66 | 27 | Inventive | 625 | 0 | 625 | 1414 | 5 | 7.2 |
| 67 | 27 | Inventive | 625 | 0.25 | 1620 | 1414 | 2.5 | 4.8 |
| 68 | 27 | Inventive | 625 | 0 | 625 | 1414 | 2.5 | 4.7 |
| 69 | 28 | Inventive | 200 | 0 | 200 | 1410 | 12 | 18.9 |
| 70 | 28 | Inventive | 212 | 0 | 200 | 1410 | 1.7 | 8.3 |
| 71 | 28 | Inventive | 625 | 0.25 | 1620 | 1414 | 5 | 7.3 |
| 72 | 28 | Inventive | 625 | 0 | 625 | 1414 | 5 | 7.2 |
| 73 | 28 | Inventive | 1200 | 0 | 50 | 1410 | 2.5 | 6.2 |
| 74 | 28 | Inventive | 1500 | 0 | 1500 | 1410 | 5 | 5.9 |
| 75 | 28 | Inventive | 625 | 0.25 | 1620 | 1414 | 2.5 | 4.8 |
| 76 | 28 | Inventive | 625 | 0 | 625 | 1410 | 2.5 | 4.7 |
| 77 | 29 | Inventive | 200 | 0 | 200 | 1410 | 12 | 18.9 |
| 78 | 29 | Inventive | 163 | 0 | 200 | 1410 | 1.7 | 10.0 |
| 79 | 29 | Inventive | 212 | 0 | 200 | 1410 | 1.7 | 8.3 |
| 80 | 29 | Inventive | 625 | 0.25 | 1620 | 1414 | 5 | 7.3 |
| 81 | 29 | Inventive | 625 | 0 | 625 | 1414 | 5 | 7.2 |
| 82 | 29 | Inventive | 1200 | 0 | 50 | 1410 | 2.5 | 6.2 |
| 83 | 29 | Inventive | 1500 | 0 | 1500 | 1410 | 5 | 5.9 |
| 84 | 29 | Inventive | 625 | 0.25 | 1620 | 1414 | 2.5 | 4.8 |
| 85 | 29 | Inventive | 625 | 0 | 625 | 1414 | 2.5 | 4.7 |
| 86 | 30 | Inventive | 163 | 0 | 200 | 1410 | 1.7 | 10.0 |
| 87 | 31 | Inventive | 625 | 0.25 | 1620 | 1425 | 15 | 17.3 |
| 88 | 31 | Inventive | 625 | 0 | 200 | 1410 | 12 | 14.7 |
| 89 | 31 | Inventive | 625 | 0.25 | 1620 | 1425 | 11 | 13.3 |
| 90 | 31 | Inventive | 625 | 0.25 | 1620 | 1438 | 10 | 12.4 |
| 91 | 31 | Inventive | 625 | 0.25 | 1620 | 1414 | 10 | 12.3 |
| 92 | 31 | Inventive | 625 | 0.25 | 1620 | 1400 | 10 | 12.3 |

TABLE 2-continued

Firing schedules used for examples

| Example Number | Composition Number | Example Type | Mean Heating Rate (25–1275° C.) (° C./hr) | Soak Time at 1275° C. (hrs) | Mean Heating Rate (1275–1410° C.) (° C./hr) | Maximum Soak Temperature (° C.) | Soak Time at Maximum Temperature (hrs) | Cycle Time* (hours) |
|---|---|---|---|---|---|---|---|---|
| 93 | 31 | Comparative | 625 | 0.25 | 1620 | 1400 | 6 | 8.3 |
| 94 | 31 | Comparative | 625 | 0.25 | 1620 | 1414 | 5 | 7.3 |
| 95 | 31 | Comparative | 625 | 0 | 625 | 1410 | 5 | 7.2 |
| 96 | 31 | Comparative | 625 | 0.25 | 1620 | 1414 | 2.5 | 4.8 |
| 97 | 32 | Inventive | 625 | 0 | 200 | 1410 | 12 | 14.7 |
| 98 | 32 | Comparative | 625 | 0 | 625 | 1410 | 5 | 7.2 |
| 99 | 32 | Comparative | 25 | 0 | 25 | 1410 | 8 | 63.4 |
| 100 | 33 | Inventive | 625 | 0 | 200 | 1410 | 12 | 14.7 |
| 101 | 33 | Comparative | 625 | 0 | 625 | 1410 | 5 | 7.2 |
| 102 | 33 | Comparative | 25 | 0 | 25 | 1410 | 8 | 63.4 |
| 103 | 34 | Inventive | 200 | 0 | 200 | 1410 | 12 | 18.9 |
| 104 | 34 | Inventive | 625 | 0 | 200 | 1410 | 12 | 14.7 |
| 105 | 34 | Comparative | 625 | 0 | 625 | 1410 | 5 | 7.2 |
| 106 | 35 | Inventive | 200 | 0 | 200 | 1410 | 12 | 18.9 |
| 107 | 36 | Comparative | 625 | 0 | 625 | 1410 | 5 | 7.2 |
| 108 | 36 | Comparative | 625 | 0 | 200 | 1410 | 12 | 14.7 |
| 109 | 36 | Comparative | 40 | 0 | 14 | 1430 | 10 | 52.3 |
| 110 | 37 | Comparative | 625 | 0 | 625 | 1410 | 5 | 7.2 |
| 111 | 37 | Comparative | 25 | 0 | 25 | 1410 | 8 | 63.4 |
| 112 | 38 | Comparative | 625 | 0 | 625 | 1410 | 5 | 7.2 |
| 113 | 38 | Comparative | 25 | 0 | 25 | 1410 | 8 | 63.4 |

*Duration of firing schedule from room temperature to end of soak at maximum temperature.

TABLE 3

Properties of fired examples

| Example Number | Composition Number | Mean CTE ($10^{-7}$ ° C.$^{-1}$) (25–800° C.) | XRD I-Ratio | Computed Value of "R" | RESIDUAL PHASES % Mullite | % Alumina | % Spinel | POROSIMETRY Vol % Porosity | Total Pore Volume ($cm^3/g$) | Median pore Diameter ($\mu m$) | % of Total Porosity between 0.5 $\mu m$ and 5.0 $\mu m$ | % of Total Porosity Greater than 10 $\mu m$ |
|---|---|---|---|---|---|---|---|---|---|---|---|---|
| 1 | 1 | 3.0 | | −2.21 | 1.6 | 0.0 | 2.3 | 16.1 | 0.0177 | 0.6 | 2.3 | 48.3 |
| 2 | 1 | 2.0 | 0.85 | −3.22 | 1.7 | 0.0 | 2.8 | 9.4 | 0.0410 | 0.4 | 4.9 | 33.4 |
| 3 | 2 | 1.8 | | −2.21 | 2.0 | 0.0 | 3.3 | 8.4 | 0.0404 | 0.4 | 16.6 | 8.4 |
| 4 | 2 | 0.5 | 0.87 | −3.22 | 1.9 | 0.0 | 4.0 | 12.3 | 0.0557 | 0.1 | 16.9 | 42.4 |
| 5 | 3 | 4.3 | 0.83 | −3.22 | 1.4 | 0.0 | 3.0 | 25.3 | 0.1370 | 10.2 | 3.6 | 51.7 |
| 6 | 4 | 31.2 | | 20.85 | 0.0 | 0.0 | 20.8 | 14.1 | 0.0649 | 1.8 | 36.2 | 27.6 |
| 7 | 4 | 16.7 | | 11.41 | 0.0 | 0.0 | 10.2 | 21.5 | 0.1080 | 1.8 | 61.1 | 23.1 |
| 8 | 4 | 5.2 | 0.81 | not applicable | 0.0 | 0.0 | 4.4 | | | | | |
| 9 | 5 | 5.0 | | −2.21 | 0.6 | 0.0 | 0.5 | 23.7 | 0.1252 | 2.8 | 45.2 | 21.9 |
| 10 | 5 | 3.2 | 0.69 | −3.22 | 0.8 | 0.0 | 1.5 | 18.0 | 0.0881 | 5.4 | 17.3 | 32.9 |
| 11 | 5 | 10.4 | 0.73 | not applicable | 0.8 | 0.0 | 0.0 | | | | | |
| 12 | 6 | 4.8 | 0.82 | −3.22 | 0.9 | 0.0 | 0.0 | 17.4 | 0.0865 | 3.1 | 14.3 | 27.1 |
| 13 | 6 | 16.1 | 0.67 | not applicable | 1.5 | 0.0 | 0.0 | 20.4 | 0.1115 | 2.3 | 31.7 | 31.8 |
| 14 | 7 | 8.5 | 0.78 | −2.21 | 1.4 | 0.0 | 0.3 | 27.0 | 0.1542 | 5.4 | 41.8 | 21.6 |
| 15 | 7 | 3.9 | 0.77 | −3.22 | 1.3 | 0.0 | 1.2 | 22.6 | 0.1173 | 8.7 | 8.1 | 41.9 |
| 16 | 8 | 6.2 | 0.79 | −1.56 | 1.1 | 0.0 | 1.8 | 30.4 | 0.1781 | 5.8 | 32.4 | 17.2 |
| 17 | 8 | 18.6 | 0.45 | not applicable | 1.5 | 0.0 | 0.0 | 37.4 | 0.2454 | 2.6 | 81.2 | 11.5 |
| 18 | 9 | 8.9 | | −0.38 | 2.4 | 0.5 | 2.3 | 32.4 | 0.1961 | 5.5 | 40.1 | 15.5 |
| 19 | 9 | 13.0 | 0.71 | not applicable | 1.9 | 0.0 | 0.8 | | | | | |
| 20 | 10 | 12.2 | | 2.88 | 1.0 | 0.0 | 0.0 | 36.8 | 0.2420 | 1.9 | 94.9 | 3.6 |
| 21 | 10 | 16.9 | 0.67 | not applicable | 1.5 | 0.0 | 0.0 | 38.9 | 0.2569 | 1.4 | 95.1 | 4.0 |
| 22 | 11 | 9.8 | | 2.88 | 0.8 | 0.0 | 0.1 | 35.8 | 0.2298 | 3.4 | 68.3 | 14.6 |
| 23 | 11 | 11.2 | 0.73 | not applicable | 0.8 | 0.0 | 0.0 | 37.6 | 0.2400 | 1.5 | 89.9 | 7.0 |
| 24 | 12 | 13.1 | | 5.87 | 1.4 | 0.0 | 0.0 | 28.3 | 0.1594 | 2.0 | 89.5 | 6.1 |
| 25 | 12 | 16.9 | 0.71 | not applicable | 1.5 | 0.0 | 0.0 | 22.6 | 0.1204 | 1.8 | 86.0 | 9.1 |
| 26 | 13 | 7.5 | | 0.42 | 0.0 | 0.0 | 3.0 | | | | | |
| 27 | 13 | 14.6 | | 7.09 | 0.8 | 0.0 | 8.3 | 10.8 | 0.0486 | 0.5 | 33.5 | 11.7 |
| 28 | 13 | 19.8 | | 10.42 | 0.0 | 0.0 | 9.0 | | | | | |
| 29 | 14 | 25.7 | | 18.58 | 1.7 | 0.7 | 14.1 | | | | | |
| 30 | 14 | 20.4 | | 15.73 | 2.2 | 0.0 | 10.7 | | | | | |
| 31 | 14 | 19.5 | | 7.75 | 1.0 | 0.0 | 5.4 | 39.1 | 0.2630 | 7.8 | 2.1 | 23.7 |
| 32 | 14 | 5.2 | | not applicable | | | | | | | | |
| 33 | 15 | 2.5 | | −4.55 | 2.0 | 0.0 | 0.9 | | | | | |
| 34 | 15 | 4.6 | | −2.81 | 2.0 | 0.9 | 1.3 | 10.5 | 0.0476 | 0.3 | 5.9 | 19.3 |
| 35 | 15 | 5.6 | | −1.94 | 1.5 | 0.9 | 1.7 | 10.4 | 0.0472 | 0.3 | 7.0 | 18.9 |

TABLE 3-continued

Properties of fired examples

| Example Number | Composition Number | Mean CTE (10⁻⁷ °C.⁻¹) (25–800° C.) | XRD I-Ratio | Computed Value of "R" | RESIDUAL PHASES % Mullite | % Alumina | % Spinel | Vol % Porosity | Total Pore Volume (cm³/g) | Median pore Diameter (μm) | % of Total Porosity between 0.5 μm and 5.0 μm | % of Total Porosity Greater than 10 μm |
|---|---|---|---|---|---|---|---|---|---|---|---|---|
| 36 | 15 | 9.8 | 0.79 | not applicable | 0.8 | 0.6 | 1.6 | 9.8 | 0.0451 | 0.2 | 20.4 | 8.6 |
| 37 | 16 | 3.0 | | −4.55 | 1.2 | 1.1 | 1.2 | | | | | |
| 38 | 16 | 6.2 | | −2.81 | 1.7 | 1.6 | 1.2 | 13.8 | 0.0650 | 0.3 | 22.8 | 14.8 |
| 39 | 16 | 8.5 | | −1.94 | 2.1 | 1.4 | 1.6 | 11.8 | 0.0552 | 0.2 | 16.5 | 7.1 |
| 40 | 16 | 11.3 | 0.78 | not applicable | 1.0 | 0.9 | 1.3 | 12.6 | 0.0598 | 0.9 | 68.7 | 5.4 |
| 41 | 17 | 6.4 | | −2.83 | 3.3 | 1.4 | 2.9 | 18.6 | 0.0902 | 27.8 | 8.6 | 76.3 |
| 42 | 18 | 5.0 | | −2.83 | 3.1 | 0.6 | 2.6 | 22.2 | 0.1132 | 15.5 | 6.0 | 79.7 |
| 43 | 19 | 2.9 | | −0.78 | 3.0 | 0.7 | 2.1 | 23.1 | 0.1232 | 9.4 | 5.8 | 44.1 |
| 44 | 19 | 4.5 | 0.87 | −1.79 | 2.3 | 0.6 | 3.2 | 23.3 | 0.1206 | 14.2 | 7.1 | 72.5 |
| 45 | 20 | 0.7 | | −5.72 | 1.3 | 0.0 | 1.3 | 17.3 | 0.0849 | 8.2 | 14.3 | 39.3 |
| 46 | 20 | 1.2 | 0.87 | −6.73 | 2.5 | 0.0 | 1.4 | 15.0 | 0.0703 | 3.1 | 19.6 | 48.6 |
| 47 | 21 | 3.8 | 0.87 | −2.83 | 2.7 | 0.0 | 2.4 | 28.0 | 0.1381 | 13.8 | 1.2 | 82.5 |
| 48 | 22 | 3.2 | | −4.26 | 1.7 | 0.0 | 1.5 | 30.0 | 0.1764 | 3.2 | 88.5 | 6.2 |
| 49 | 22 | 3.6 | 0.83 | −2.83 | 1.9 | 0.0 | 2.5 | 23.1 | 0.1245 | 4.6 | 61.0 | 5.1 |
| 50 | 23 | 5.9 | | 1.18 | 2.7 | 0.0 | 3.4 | 25.5 | 0.1365 | 16.0 | 0.3 | 89.6 |
| 51 | 24 | 5.7 | | −1.25 | 2.3 | 0.0 | 2.1 | 33.3 | 0.2055 | 13.0 | 2.0 | 73.0 |
| 52 | 25 | 1.0 | | −4.23 | 1.6 | 0.0 | 0.0 | 23.2 | 0.1246 | 7.9 | 13.6 | 35.7 |
| 53 | 25 | 2.7 | | −2.8 | 2.6 | 0.0 | 1.9 | 23.3 | 0.1227 | 13.3 | 0.0 | 70.3 |
| 54 | 25 | 3.9 | | −2.8 | 2.2 | 0.0 | 1.4 | | | | | |
| 55 | 25 | 2.3 | | −3.29 | 1.9 | 0.0 | 1.3 | 20.9 | 0.1101 | 7.0 | 24.5 | 34.8 |
| 56 | 25 | 4.3 | | −4.87 | 2.1 | 0.0 | 1.6 | 11.2 | 0.0505 | 17.0 | 8.7 | 56.4 |
| 57 | 25 | 4.5 | | −1.93 | 2.1 | 0.0 | 1.9 | 21.3 | 0.1098 | 12.8 | 0.2 | 66.9 |
| 58 | 25 | 5.8 | | −1.93 | 2.2 | 0.0 | 2.7 | | | | | |
| 59 | 26 | 5.8 | | −4.23 | 2.8 | 0.0 | 0.0 | 25.2 | 0.1404 | 4.8 | 48.4 | 17.8 |
| 60 | 26 | 8.3 | 0.83 | −2.8 | 1.9 | 0.0 | 0.8 | 23.5 | 0.1258 | 8.6 | 9.8 | 38.0 |
| 61 | 28 | 5.3 | | −2.8 | 3.2 | 0.0 | 0.7 | 24.8 | 0.1307 | 7.4 | 9.6 | 30.5 |
| 62 | 26 | 7.7 | 0.84 | −1.93 | 2.3 | 0.0 | 1.0 | 23.9 | 0.1290 | 8.1 | 9.4 | 34.7 |
| 63 | 26 | 8.0 | | −1.93 | 2.3 | 0.0 | 1.2 | 23.3 | 0.1242 | 7.7 | 9.7 | 31.7 |
| 64 | 27 | 8.9 | | −4.23 | 2.4 | 0.0 | 0.0 | 30.7 | 0.1738 | 2.8 | 92.5 | 3.3 |
| 65 | 27 | 8.2 | 0.84 | −2.8 | 2.1 | 0.5 | 1.2 | 29.0 | 0.1654 | 4.0 | 72.3 | 10.9 |
| 66 | 27 | 5.8 | | −2.8 | 1.3 | 0.0 | 1.2 | 29.4 | 0.1677 | 4.1 | 70.7 | 10.3 |
| 67 | 27 | 8.0 | 0.84 | −1.93 | 1.7 | 0.0 | 1.2 | 28.6 | 0.1830 | 3.9 | 76.7 | 7.7 |
| 68 | 27 | 6.7 | | −1.93 | 2.0 | 0.0 | 1.8 | 29.2 | 0.1619 | 3.9 | 73.9 | 10.1 |
| 69 | 28 | 5.8 | | −4.23 | 2.9 | 0.0 | 0.0 | 32.1 | 0.1956 | 2.7 | 93.1 | 3.4 |
| 70 | 28 | 5.6 | 0.88 | −0.61 | 1.9 | 0.0 | 1.8 | 30.6 | 0.1156 | 3.0 | 87.4 | 5.6 |
| 71 | 28 | 5.3 | 0.84 | −2.8 | 2.5 | 0.5 | 1.2 | 29.1 | 0.1710 | 3.8 | 74.9 | 9.2 |
| 72 | 28 | 4.5 | | −2.8 | 2.1 | 0.0 | 1.2 | 30.2 | 0.1734 | 3.g | 12.2 | 10.0 |
| 73 | 28 | 4.3 | | −3.29 | 2.9 | 0.0 | 1.9 | 28.1 | 0.1572 | 3.2 | 80.5 | 10.6 |
| 74 | 28 | 4.8 | | −4.87 | 2.8 | 0.0 | 1.4 | 26.1 | 0.1399 | 5.5 | 42.0 | 22.4 |
| 75 | 28 | 6.2 | 0.85 | −1.93 | 2.1 | 0.0 | 1.6 | 29.8 | 0.1710 | 3.8 | 75.6 | 8.2 |
| 76 | 28 | 6.1 | | −1.93 | 2.7 | 0.0 | 2.5 | 31.0 | 0.1813 | 3.8 | 73.6 | 9.9 |
| 77 | 29 | 6.3 | | −4.23 | 2.8 | 0.0 | 0.5 | 33.6 | 0.1993 | 2.3 | 96.7 | 2.2 |
| 78 | 29 | 7.1 | | −0.55 | | | | | | | | |
| 79 | 29 | 5.6 | 0.85 | −0.67 | 2.1 | 0.0 | 1.3 | 30.1 | 0.1721 | 2.0 | 96.8 | 2.2 |
| 80 | 29 | 5.4 | 0.84 | −2.8 | 1.8 | 0.0 | 1.4 | 29.4 | 0.1670 | 2.8 | 93.1 | 4.8 |
| 81 | 29 | 3.6 | | −2.6 | 1.9 | 0.0 | 1.8 | 29.6 | 0.1693 | 2.8 | 89.5 | 6.8 |
| 82 | 29 | 2.8 | | −3.29 | 3.6 | 0.0 | 1.5 | 28.1 | 0.1447 | 2.7 | 87.6 | 9.5 |
| 83 | 29 | 3.6 | | −4.87 | 2.3 | 0.3 | 1.8 | 23.7 | 0.1294 | 3.5 | 76.3 | 15.7 |
| 84 | 29 | 5.8 | 0.88 | −1.93 | 2.1 | 0.0 | 1.8 | 30.2 | 0.1731 | 2.0 | 90.4 | 6.4 |
| 85 | 29 | 6.2 | | −1.03 | 2.0 | 0.0 | 2.0 | 29.8 | 0.1653 | 2.0 | 80.8 | 7.3 |
| 86 | 30 | 2.2 | 0.90 | −4.67 | 1.0 | 0.0 | 1.4 | 17.5 | 0.0880 | 1.2 | 71.5 | 14.1 |
| 87 | 31 | 7.3 | | −1.62 | 2.1 | 0.0 | 0.4 | 34.0 | 0.2099 | 13.1 | 0.05 | 80.2 |
| 88 | 31 | 5.1 | | −0.46 | 3.5 | 0.0 | 1.1 | 35.5 | 0.2212 | 12.1 | 1.90 | 67.3 |
| 89 | 31 | 6.9 | | −0.08 | 2.1 | 0.0 | 0.5 | | | | | |
| 90 | 31 | 4.7 | | 0.31 | 2.1 | 0.0 | 0.7 | | | | | |
| 91 | 31 | 8.9 | | 0.31 | 2.7 | 0.0 | 1.2 | | | | | |
| 92 | 31 | 8.6 | | 0.31 | 1.9 | 0.0 | 1.9 | | | | | |
| 93 | 31 | 11.8 | | 1.86 | 1.8 | 0.0 | 3.3 | | | | | |
| 94 | 31 | 10.2 | | 2.24 | 2.8 | 0.0 | 2.8 | 36.6 | 0.2249 | 14.0 | 0.0 | 79.7 |
| 95 | 31 | 11.1 | | 2.24 | 2.8 | 0.0 | 3.7 | | | | | |
| 96 | 31 | 12.0 | | 3.21 | 2.6 | 0.0 | 4.1 | | | | | |
| 97 | 32 | 8.1 | | −1.12 | 3.2 | 0.0 | 2.1 | 38.9 | 0.2833 | 7.5 | 11.5 | 18.9 |
| 98 | 32 | 11.8 | | −1.32 | 2.5 | 0.0 | 3.5 | 38.0 | 0.2474 | 8.6 | 8.4 | 38.3 |
| 99 | 32 | 10.5 | 0.84 | not applicable | 1.8 | 0.0 | 0.5 | 44.6 | 0.3249 | 3.1 | 91.5 | 6.6 |
| 100 | 33 | 8.2 | | −1.12 | 3.7 | 0.0 | 0.9 | 33.8 | 0.2081 | 4.3 | 70.8 | 6.0 |
| 101 | 33 | 11.9 | | 1.32 | 2.6 | 0.0 | 1.9 | 34.4 | 0.2179 | 4.3 | 71.6 | 9.2 |
| 102 | 33 | 10.3 | 0.82 | not applicable | 2.3 | 0.0 | 0.0 | 37.6 | 0.2400 | 1.5 | 89.9 | 7.0 |
| 103 | 34 | 6.7 | | −2.55 | 1.0 | 0.5 | 3.3 | 27.8 | 0.1561 | 7.6 | 7.0 | 24.1 |
| 104 | 34 | 6.2 | | −3.56 | 0.0 | 0.0 | 11.5 | 24.8 | 0.1327 | 9.7 | 1.1 | 44.5 |

TABLE 3-continued

Properties of fired examples

| Example Number | Composition Number | Mean CTE $(10^{-7}\,°C.^{-1})$ (25–800° C.) | XRD I-Ratio | Computed Value of "R" | RESIDUAL PHASES % Mullite | % Alumina | % Spinel | Total Pore Vol % Porosity | POROSIMETRY Total Pore Volume $(cm^3/g)$ | Median pore Diameter $(\mu m)$ | % of Total Porosity between 0.5 $\mu m$ and 5.0 $\mu m$ | % of Total Porosity Greater than 10 $\mu m$ |
|---|---|---|---|---|---|---|---|---|---|---|---|---|
| 105 | 34 | 18.1 |  | 2.05 | 0.5 | 0.7 | 7.5 | 24.4 | 0.1318 | 10.2 | 3.1 | 50.8 |
| 106 | 35 | 1.9 |  | −2.55 | 0.9 | 0.0 | 1.5 | 31.2 | 0.1924 | 2.5 | 90.0 | 6.5 |
| 107 | 36 | 22.7 |  | 12.37 | 0.5 | 1.6 | 9.7 | 30.9 | 0.1787 | 22.0 | 0.0 | 99.7 |
| 108 | 36 | 13.9 |  | 6.76 | 0.0 | 0.6 | 8.8 | 32.2 | 0.1869 | 18.7 | 0.1 | 99.0 |
| 109 | 36 | 4.2 | 0.87 | not applicable | 1.3 | 0.0 | 1.8 |  |  |  |  |  |
| 110 | 37 | 18.1 |  | 10.65 | 2.1 | 0.0 | 1.9 | 36.9 | 0.2402 | 0.9 | 4.5 | 47.2 |
| 111 | 37 | 16.6 | 0.73 | not applicable | 1.9 | 0.0 | 1.5 | 35.7 | 0.2329 | 5.9 | 35.1 | 16.8 |
| 112 | 38 | 17.2 |  | 9.37 | 1.8 | 0.0 | 1.9 | 37.0 | 0.2352 | 10.0 | 5.7 | 49.9 |
| 113 | 38 | 15.8 | 0.74 | not applicable | 2.2 | 0.0 | 1.5 | 33.8 | 0.2119 | 6.0 | 34.8 | 23.2 |

TABLE 4

Effect of various firing schedules on cracking of full size ceramic honeycomb bodies

| Example Number | Heating Rate 25–450° C. (° C./hr) | Heating Rate 450–550° C. (° C./hr) | Heating Rate 550–800° C. (° C./hr) | Heating Rate 800–950° C. (° C./hr) | Heating Rate 950–1150° C. (° C./hr) | Heating Rate 1150–1275° C. (° C./hr) | Soak Time at 1275° C. (hrs) | Heating Rate 1275–1410° C. (° C./hr) | Mean Heating Rate 25–1410° C. (° C./hr) | Total Cycle Time (hrs) | Skin Cracks | Top Face Cracks | Bottom Face Cracks |
|---|---|---|---|---|---|---|---|---|---|---|---|---|---|
| 114 | 625 | 625 | 625 | 625 | 625 | 625 | 0.25 | 540 | 554 | 5.0 | SEVERE | SLIGHT | SEVERE |
| 115 | 581 | 581 | 581 | 175 | 175 | 500 | 0.25 | 540 | 339 | 6.6 | MODERATE | SLIGHT | SLIGHT |
| 116 | 567 | 100 | 600 | 175 | 175 | 500 | 0.25 | 540 | 282 | 7.4 | MODERATE | NONE | NONE |
| 117 | 567 | 100 | 600 | 100 | 133 | 520 | 0.00 | 540 | 245 | 8.2 | NONE | NONE | NONE |

What is claimed is:

1. A method of producing a cordierite body, the method comprising:
   a) providing cordierite-forming raw materials selected from the group consisting of talc, calcined talc, MgO-forming component, magnesium aluminate spinel, $SiO_2$-forming component, $Al_2O_3$-forming component, kaolin, calcined kaolin, mullite, and combinations thereof, chosen such that the quantity R is less than about 1.207, wherein R is defined as the solution to the following mathematical computation:

0.253 (wt. % mullite powder)
   +0.278(wt. % $SiO_2$ powder)
   +0.00590(wt. % $SiO_2$ powder)(wt. % spinel powder)
   −0.0193(wt. % $SiO_2$ powder)(heating time at maximum temperature)
   −0.348(heating time at maximum temperature)
   −0.00237(mean heating rate from 25° C. to 1275° C.)
   +0.0736(wt. % alpha $Al_2O_3$ powder)(mean particle size of alpha $Al_2O_3$ powder)
   +0.0892(wt. % $Al(OH)_3$ powder)(mean particle size of $Al(OH)_3$ powder)
   −0.215(wt. % dispersible high surface area $Al_2O_3$-forming component)
   +2.392($log_{10}$(1+(wt. % MgO-forming component)(wt. % calcined kaolin))), wherein the particle size is measured in micrometers, time is in hours, temperature is in degrees centigrade, and mean heating rate is in ° C. per hour, and wherein the $SiO_2$ powder is selected from the group consisting of quartz, fused silica, colloidal silica powder, and combinations thereof;

b) intimately blending the raw materials with an effective amount of vehicle and forming aids to form a plastic mixture therefrom;
   c) forming said raw materials into a green body;
   d) drying the green body; and
   e) heating said green body from room temperature up to a maximum temperature of about 1360° C. to 1435° C. at an average heating rate of at least about 70° C. per hour and holding at said maximum temperature for about 0.05 to 18 hours, wherein the total heating time from room temperature to the end of the hold at the maximum temperature is about 4.5 to 20 hours, to produce a body that is predominately cordierite, having a mean coefficient of thermal expansion from about 25° C. to 800° C. of less than about $9 \times 10^{-7}$° $C.^{-1}$ in at least one direction.

2. A method of claim 1 wherein the raw materials are provided by combinations selected from the group consisting a first combination of talc, MgO-forming component, and kaolin, a second combination of talc, spinel, and kaolin, a third combination of talc, spinel, kaolin, and calcined kaolin, a fourth combination of talc, kaolin, and an $Al_2O_3$-forming component having a particle size of no greater than about 3.0 micrometers and/or a specific surface area not less than about 3 $m^2/g$, a fifth combination of talc, kaolin, an $Al_2O_3$-forming component having a mean particle size of no greater than about 3.0 micrometers and/or a specific surface area not less than about 3 $m^2/g$, and calcined kaolin, and a sixth combination of talc, MgO-forming component, kaolin, and Al$_2$O$_3$-forming component having a particle size of no greater than about 3.0 micrometers and/or a specific surface area not less than about 3 m$^2$/g.

3. A method of claim 2 wherein the raw materials are provided by a combination selected from the group consisting of the second combination, and the fourth combination, wherein the kaolin has a particle size of at least about 3 micrometers.

4. A method of claim 2 wherein the raw materials are provided as the fifth combination.

5. A method of claim 4 wherein the calcined kaolin has at least about 1% mullite crystallites therein.

6. A method of claim 4 wherein the Al$_2$O$_3$-forming component has a mean particle size of no greater than about 1.5 micrometers and/or a specific surface area not less than about 5 m$^2$/g.

7. A method of claim 4 wherein the mean particle size of the talc is no greater than about 4.0 micrometers.

8. A method of claim 7 wherein the mean particle size of the talc is no greater than about 2.5 micrometers.

9. A method of claim 4 wherein the mean particle size of the kaolin is no greater than about 2 micrometers.

10. A method of claim 2 wherein the raw materials are provided as the third combination and the calcined kaolin has at least about 1% by weight mullite crystallites therein.

11. A method of claim 1 wherein the average heating rate is at least about 200° C. per hour.

12. A method of claim 1 wherein the total heating time is no longer than about 15 hours.

13. A method of claim 12 wherein said total heating time is no longer than about 10 hours.

14. A method of claim 1 wherein the raw materials are shaped by extrusion.

15. A method of claim 14 wherein said raw materials are extruded into a honeycomb structure.

\* \* \* \* \*